April 30, 1968     R. O. PECK     3,380,791

SEALED BUSHING ASSEMBLY

Filed April 26, 1965

*INVENTOR*
RICHARD O. PECK

BY   Frank J. Earnheart
     James A. Lucas

*ATTORNEYS*

United States Patent Office 3,380,791
Patented Apr. 30, 1968

3,380,791
SEALED BUSHING ASSEMBLY
Richard O. Peck, Tallmadge, Ohio, assignor to The General Tire & Rubber Company, a corporation of Ohio
Filed Apr. 26, 1965, Ser. No. 450,950
3 Claims. (Cl. 308—36.1)

ABSTRACT OF THE DISCLOSURE

The operation of a low torque elastomeric bushing, provided with lubricant at the interface between the insert and the inner sleeve, is improved by the use of an effective O ring seal. The O ring, having a diameter which is normally smaller than that of the inner sleeve, is stretched over the sleeve and fits into a radially extending groove in the insert near the end thereof. A lip on the insert, axially outside of the groove, contacts the sleeve to provide an additional seal.

Description of the invention

This invention relates to a low torque elastomeric bushing assembly. More particularly, this invention relates to a bushing assembly in which a lubricant is provided at the interface between the elastomeric insert and the inner sleeve, and at least one O ring is utilized in a novel and effective manner to retain the lubricant within the confines of the bushing and to prevent contaminants from working their way into the interface and disrupting the operation of the bushing.

Generally, the function of a bushing is to interconnect two structural components in such a manner as to permit relative axial, radial, or torsional motion between them without wear and tear. These bushings are commonly composed of three components, an inner sleeve adapted to be connected to one of the structural components, an outer sleeve which is attached to the other of the components, and an elastomeric insert interposed between the two sleeves. The relative motion of the two structural components is imparted through the sleeves to the insert which absorbs the motion through shear, compressive, or tensile deformation.

In some instances the elastomeric insert is bonded to the inner and/or outer sleeves by use of a suitable adhesive, by vulcanizing the uncured insert in place when assembling, or by subjecting the elastomer to radial compression between the two sleeves, whereby the forces of restoration of the elastomer exert a strong radial pressure against the sleeves. In these instances, a relatively large torque must be applied to the bushing in order to induce slipping between the insert and the sleeves.

Other types of bushings are used in applications where it is desirable or necessary for slipping to occur between one of the metal sleeves and the insert, such as where the oscillatory movement between the inner and outer sleeves is greater than that which can normally be accommodated by shear deformation of the insert. Since relatively little torque is used to induce slipping, this type of bushing is often referred to as a low-torque bushing or a slip bushing.

Although the insert for a low-torque bushing can be made from a variety of elastomers, one that has been found to be particularly well suited for this use is described in U.S. Patent 3,171,699 issued to Edwin M. Maxey on Mar. 2, 1965, and owned by the assignee of the present invention. This elastomer is composed principally of a rubbery polyurethane to which are added minor amounts of graphite and silicone oil to increase the natural lubricity. When an insert is prepared from this urethane composition, and is assembled between the inner and outer sleeves of a bushing, the low frictional characteristics of the insert permit relative slipping between the insert and the sleeves. However, even when using this urethane composition as the insert material, the interface between the insert and the sleeves is preferably lubricated. Various means have been devised for introducing and retaining a suitable supply of lubricant between the insert and sleeve during the life of the bushing.

As long as the lubricant remains between the contacting surfaces of the insert and sleeve, the bushing will perform quite satisfactorily. However, when one or both ends of the bushing are open, the lubricant will have a tendency to work its way out from between the surfaces during the normal operation of the bushing, thereby causing the bushing to eventually dry up. Furthermore, when the bushing is used in an environment, such as underneath the body of an automobile where it is constantly exposed to dirt, mud, water, and other contaminants, this foreign material tends to work its way into the bushing between the lubricated surfaces thereof, causing spalling and galling of the surfaces, ultimately leading to failure of the bushing.

It is an object of this invention to provide means for preventing loss of lubricant from between the slipping surfaces of a low torque bushing.

Another object is the use of an O ring radially stretched around the inner sleeve of a bushing and adapted to fit into an appropriate groove within the insert near the end thereof to prevent the loss of lubricant from the interface between the sleeve and the insert, and the entry of contaminants thereinto.

These and other objects are accomplished in a manner to be hereafter described, the description of which will be facilitated by reference to the following figures in which.

Figure 1:
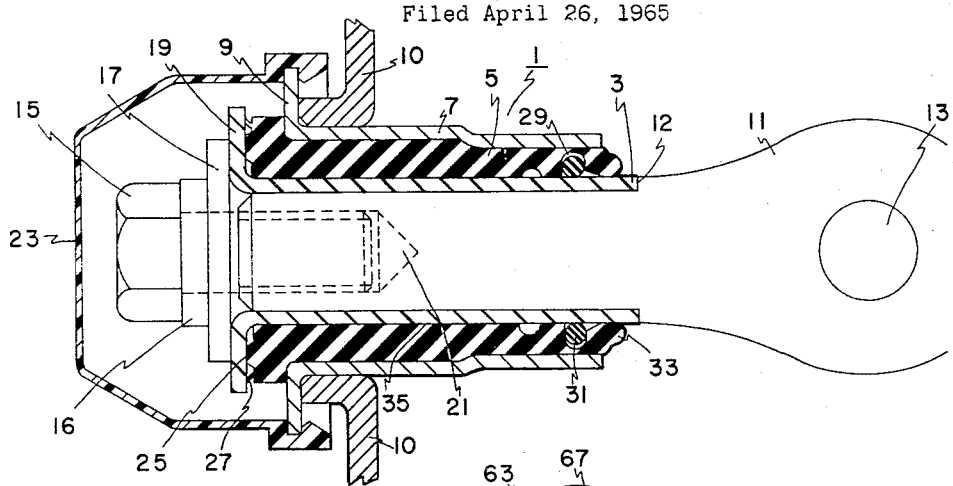
FIGURE 1 shows a cross section of a low torque bushing installed as part of the upper control arm assembly of an automobile.

Referring now to FIGURE 1, there is shown a portion of the upper control arm assembly for an automobile. One end of the upper control arm is attached to a ball joint, which in turn is affixed to one of the front axles by a rigid metal bracket. The other end of the control arm is attached to the frame of the automobile through a low-torque bushing.

In FIGURE 1 is shown a bushing 1 having an inner metal sleeve 3, an elastomeric insert 5, and an outer metal sleeve 7. One end of the inner sleeve 3 is flared radially outwardly to form a flange 19, and the corresponding end of the outer sleeve 7 is flared in like manner to form flange 9. The end 10 of the upper control arm opposite the ball joint surrounds the outer sleeve 7 in abutting relationship with flange 9. Disposed within the inner sleeve 3 is the upper control arm shaft 11 provided with an annulus 13 through which a bolt is inserted to secure the shaft to the frame of the car. The shaft 11 is held within the inner sleeve 3 by a bolt 15, lock washer 16, and washer 17 abutting radially outwardly extending flange 19 of the inner sleeve 3. A recess 21 in shaft 11 is threadedly adapted to receive said bolt 15. The axial location of the shaft relative to the bushing is determined by a shoulder 12 on the shaft which abuts against the inner sleeve 3 when the bolt 15 is threaded into place. Cap 23 fits over one end of the assembly and snaps in place over flange 9, the function of the cap being to prevent the ingress of dirt and other contaminants into that end of the assembly.

One end of the elastomeric insert 5 is disposed between the two flanges 9 and 19 of the outer and inner metal sleeves 7 and 3 and is provided with a ledge 25 and a grease-retaining lip 27 in contact with flange 19. A groove 29 at the other end of the insert 5 is adapted to receive an O ring 31 which is of a normally smaller diameter than the outer diameter of sleeve 3. The depth of the groove 29 is slightly greater than the radial thickness of the O ring 31 when assembled on the sleeve 3, thereby allowing spacial clearance between the top of the O ring and the bottom of the groove. A sealing lip 33 immediately and axially outside of the O ring 31 contacts the inner sleeve 3. The O ring 31 and lip 33 cooperate to prevent the ingress of dirt and contaminants from the open end of the bushing into the lubricant-containing area between the inner sleeve 3 and insert 5. It further serves to minimize loss of lubricant from this area.

Figure 2:
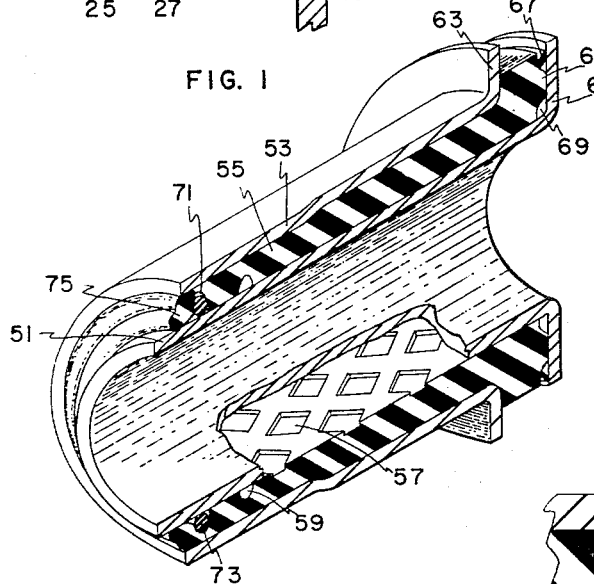
FIGURE 2 is a perspective cross section of the bushing shown in FIGURE 1, partially cut away.

Referring now to FIGURE 2, there is shown a perspective view of a bushing of the type used in the upper control arm of FIGURE 1. A part of the inner sleeve is cut away to show one of the possible arrangements for retaining lubricant at the interface between the sleeve and the insert. The bushing consists of an inner sleeve 51 and an outer sleeve 53, both preferably of metal, with an elastomeric insert 55 disposed therebetween. The insert is preferably compounded from a rubbery polyurethane material of the type described in the aforementioned Maxey patent. Although the insert has a certain amount of natural lubricity, it is preferred to provide additional lubricant at the surface of the insert and the inner sleeve 51 on which it is to rotate.

The inner sleeve contacting surface of the insert 55 is provided with a series of lubricant containing recesses 57, which are generally formed in the insert during the molding operation. These recesses or pockets are preferably arranged in a symmetrical pattern and are, for example, shaped as squares diagonally oriented in respect to the rotational axis of the bushing. The details and sizes of these recesses, as well as other salient features relating to a lubricated low-torque bushing, are claimed and described in copending patent application S.N. 245,558 by Richard Peck and Charles Slemmons filed on Dec. 18, 1962 and assigned to the assignee of the present invention. Briefly, the lubricant containing recesses should preferably occupy between about 20 and about 50 percent of the inner surface of the insert and should be filled with a high quality lubricant such as a silicone grease. The recesses are independent of each other so as to preclude normal flow from one recess to the other. The spacings between adjacent recesses are determined by the maximum rotation and axial movement that the insert will have relative to the inner sleeve, the intention being that the lubricant in the recesses will normally contact the entire outer surface of the sleeve during said relative movement. Additional lubricant is provided in annular groove 59 to provide lubrication for the outer end of the bushing. Preferably, there are no lubricant recesses axially outside of this groove.

Normally, the presence of a lubricant between the inner sleeve 51 and the insert 55, and the absence of a lubricant between the insert 55 and the outer sleeve 53, will permit slipping at the inner sleeve but will effectively preclude any rotation or slipping between the insert and the outer sleeve. The fact that the insert is radially compressed when assembling it into the outer sleeve 53 also serves to prevent slipping. Normally, the amount of compression ranges from between about two to four percent, this being found effective to prevent slipping. Alternatively, the insert 55 may be bonded to the outer sleeve 53, utilizing a suitable adhesive, to accomplish the same purpose.

One end of the assembled bushing is compressed between flange 61 of inner sleeve 51 and flange 63 of outer sleeve 53. The rib 65 and lip 67 on the end of insert 55 contact the flange 61 in tight engagement, and cooperate with annular passage 69 to prevent loss of lubricant from that end of the bushing. At the other end of the bushing, groove 71 in insert 55 is adapted to receive an O ring 73. As stated before, this O ring 73 has a diameter which is normally smaller than the outer diameter of inner sleeve 51. When assembled onto the sleeve, the O ring is stretched and grips the inner sleeve in tight engagement therewith. The portion of the insert axially outside of the groove forms a lip 75 which, before assembling, has a diameter which is smaller than the inner sleeve 51. After assembly, the lip grips the inner sleeve and combines with the O ring to retain the lubricant in the bushing, and to prevent dirt from getting in thereto.

The preassembled diameter of the O ring used in this invention is generally about 20 to 30 percent smaller than the outer diameter of the inner metal sleeve. Thus, when the ring is assembled onto the sleeve, it grips the sleeve sufficiently tight so that it will not rotate thereon. Thus, relative rotation between the inner sleeve and the elastomeric insert causes the O ring to rotate with the sleeve, and slide in the groove.

Figure 3:
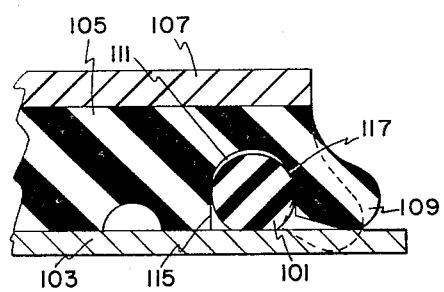
FIGURE 3 is an enlarged partial cross section of the bushing showing details of the O ring assembled around the inner sleeve and disposed within the groove provided in the insert.

FIGURE 3 is an enlarged view showing various details of the novel lubricant seal utilized with a low torque bushing consisting of an elastomeric insert 105 confined between an inner sleeve 103 and an outer sleeve 107. Disposed in tight engagement around said inner sleeve 103, and within groove 111, is an O ring of normally smaller diameter than that of the sleeve. When stretched around the sleeve, the O ring suffers a reduction in width on the order of approximately 10 to 20 percent. The stretching also causes the O ring to grip the sleeve in planar contact therewith.

On the radially inner surface of the elastmeric insert 105 is a groove 111 adapted to receive the O ring. The lateral dimensions of the groove correspond to the width of the O ring stretched around the inner sleeve, and as a result, the O ring contacts the inner wall 115 and outer wall 117 of the groove at points which are approximately 90° from where the O ring contacts the inner sleeve. The groove is made sufficiently deep so that a clearance is provided between the outer diameter of the O ring and the bottom of the groove. This allows for radial deflection of the outer sleeve relative to the inner sleeve, and consequent compression of the insert 105 without having the bottom of the groove contact and radially compress the O ring.

The insert is provided, axially outside of the groove, with a lip 109 which contacts the inner sleeve 103 to form a seal. Prior to assembly, the lip assumes a position approximating that shown in outline, and after assembly, the lip is urged in a radially outward direction by the sleeve. From the point of contact between the lip and the inner sleeve, the lip extends at an oblique angle to the point at which it intersects the outer wall 117 of the groove.

In order for contaminants to work their way into the lubricating interface between the insert 105 and sleeve 103, these contaminants must first pass between lip 109 and sleeve 103 and then get past the O ring 101. The restorative tendency of the stretched O ring exerts a radially inwardly directed gripping force against the inner sleeve 103 thereby preventing the contaminants from passing between the two. Thus, these particles of dirt and the like must pass around the O ring in the groove 111 where they are resisted by the contacting surfaces between the O ring and the sides of the groove. In like manner, the O ring and slip serve to effectively prevent the loss of lubricant from between the two surfaces.

As stated before, rotational movement between the inner and outer sleeves causes the insert 105 to slip on the lubricated surface of the inner sleeve 103. The gripping force of the O ring on the inner sleeve 103 is much greater than the forces between the O ring and the sides of the groove. Therefore, the O ring slides in the groove rather than on the sleeve itself. When the insert 105 is subjected to radial compression, the gap between the O ring and the bottom of the groove prevents the groove from bottoming out against the O ring thereby precluding the possibility that the Oring will move with the insert.

The planar contact between the stretched O ring and the inner sleeve 103 serves an additional purpose. Under axial or thrust loads, the insert 105 will have a tendency to slip in an axial direction over the sleeve 103. Because of the tight grip of the O ring on the sleeve 103, the O ring does not slide on the inner sleeve as has heretofore been the case, but instead, rolls from its normal position. It is possible to roll the O ring as much as 60° in either direction from its neutral position before slipping will occur, and for most applications, this is entirely suitable. Thus, a substantial amount of axial movement can be tolerated while still maintaining an effective seal.

Figure 4:
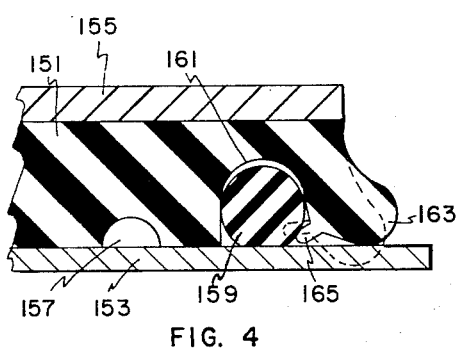
FIGURE 4 is an enlarged close up similar to FIGURE 3 showing a modification of the groove in the insert.

FIGURE 4 is another enlarged cross-sectional view of the O ring and groove showing a modification in the design of the lip which seals against the inner sleeve. The bushing therein depicted comprises an elastomeric insert 151 held between an inner sleeve 153 and an outer sleeve 155. A lubricant receiving groove 157 is located on the inner surface of the insert 151 to lubricate the outer end of the bushing, it being understood that the remainder of the bushing is preferably lubricated in the manner similar to that shown in FIGURE 2. The O ring 159 is stretched around the inner sleeve 153 fitting into an appropriate groove 161 on the inner surface of the insert 151. The insert is provided at its outer end with a lip 163 similar to that shown in FIGURE 3 with the addition of a ridge 165 or appendage which contacts the O ring in proximity to the inner sleeve 153. This ring-contacting ridge provides an additional line contact around the circumference of the O ring, thereby providing additional protection against dirt and other contaminants. Prior to assembly, this ridge 163 forms an angle of approximately 30° from the axis through the insert, and after assembly forms an angle of approximately 45°. Preferably the ridge does not contact the inner sleeve when the bushing is assembled.

The discussion heretofore relating to the elastomeric insert has been limited to the use of an insert fabricated from polyurethane, preferably one that has a certain degree of inherent lubricity. The advantage of using such a compound resides in the possibility that through one means or another the lubricant at the interface between the insert and the inner sleeve may be lost through exudation causing the bushing to dry up. If this should occur, the natural lubricating properties of the insert will permit the bushing to continue to operate for a substantial length of time thereafter.

Although it was previously stated that polyurethane is the preferred elastomer, it should be understood that the insert may be prepared from other elastomers including, but not limited, to polyethylene, Teflon, and various polymeric amides, the most common one being nylon.

The selection of a suitable material for the O ring is made dependent upon several factors. For instance, a material should be used which will not take a set, i.e., one that will not lose its resiliency and plastic memory over a long period of time. Furthermore, the O ring should be resistant to the type of grease or other lubricant used in the bushing, and should be able to withstand the wear induced by oscillation and axial movement of the bushing. In addition, the material should have good resistance to environmental conditions such as oxidation, ozonation, and extreme temperature variations.

One material which has been found to be particularly suitable for this application is ethylene-propylene rubber. Also, the terpolymer of ethylene and propylene along with a third ingredient can be used. Natural rubber is still another material that has been found to be generally satisfactory for use as an O ring.

Although the present discussion has heretofore been limited to the use of this low torque sealed bushing in an upper control arm assembly of an automobile, it is to be understood that there are many other applications in which this bushing can be utilized. For example, other automotive applications include the steering gear idler arm assembly which pivotally connects the cross-rod to the frame of the auto. In addition, a low torque bushing can be used at the shock absorber pivotal joints and in the rear suspension linkage of the vehicle.

More generally, a bushing of this type can be used in any application where the oscillatory movement of the parts relative to one another is greater than that which can normally be accommodated by bonded bushings or where the ease of movement of one part relative to another are of prime consideration. It can thus be seen that there are many nonautomotive applications for this type of bushing.

Furthermore, this novel assembly, because of the low friction surface between the inner sleeve and the elastomeric insert, can be used as a bearing wherein the outer sleeve and insert rotate around the inner sleeve. It is understood, however, that the O ring retains a firm grip on the inner sleeve and that any sliding relative thereto occurs between the O ring and the walls of the groove. The O ring and the lip thus serve to retain the lubricant at the interface between the insert and the inner sleeve where relative motion occurs, and to keep out dirt and the like.

It should furthermore be understood that other embodiments and arrangements of the bushing are contemplated as coming within the scope of the invention. For example, a groove can be provided at either end of the insert, each groove adapted to receive an O ring stretched over the inner sleeve. Furthermore, the inner sleeve may be replaced by a shaft with the insert and O ring slipped over the shaft. Moreover, the outer sleeve may be replaced by a housing, or in certain applications may be dispensed with entirely. Other structural modifications and changes can also be made without departing from the novel concept embodied in the appended claims, in which I claim:

1. A low torque bushing assembly comprising an inner metal sleeve having a radially outwardly extending flange at one end, an outer metal sleeve normally concentric and spaced from said inner sleeve and also having a radially outwardly extending flange at the same end as that of the inner sleeve, an elastomeric insert composed of a self-lubricating polyurethane composition and disposed between said sleeves, lubricant receiving recesses in said insert at the surface in contact with the inner sleeve, means to preclude sliding between the insert and the outer sleeve, the end of the insert remote from said flanges terminating in an axially inwardly directed, arcuate flexible lip disposed in sealing engagement with said inner sleeve, a circumferentially extending groove in the insert immediately and axially inside of said sealing lip opposite the inner sleeve, and an elastomeric O ring having an inner diameter between about 20 and about 30 percent smaller than the outer diameter of the outer sleeve, said O ring stretched around said sleeve and disposed within said groove, the frictional engagement between the "O" ring and the sleeve being substantially greater than the frictional engagement between the O ring and the groove, said sealing lip including additional sealing extending obliquely in toward and contacting the O ring at a point intermediate the point of engagement between the O ring and the groove and the line of engagement between the O ring and the inner sleeve, said O ring and said lip cooperating to prevent the loss of lubricant from that end of the bushing and the entry of contaminants into the area containing the lubricant.

2. The assembly according to claim 1 wherein said insert includes a second circumferentially extending groove near said first groove positioned radially inwardly thereof.

3. In combination with a bushing having inner and outer spaced apart, normally axially aligned, substantially rigid sleeves and an elastomeric insert disposed therebetween and adapted to slide around said inner sleeve with a lubricant provided at the sliding surface, the improvement characterized by means for retaining the lubricant within the confines of the insert and the sliding surface comprising:

(a) A first groove extending radially around the inner surface of the insert, (b) A second groove extending radially around the inner surface of the insert axially outside of said first groove, said second groove being generally U-shaped and having a pair of generally parallel sidewalls, an inner wall toward said first groove and an outer wall, the depth of said groove being substantially greater than the width thereof, (c) An O ring located in said second groove, the normal inner diameter of said O ring being smaller than the outer diameter of said inner sleeve, said ring stretched over said sleeve in substantially planer contact therewith and in substantially linear contact with the walls of the groove at points approximately 90° from the plane of contact whereby frictional engagement of the O ring on the sleeve is appreciably greater than the frictional contact of the O ring against the sides of the groove thereby causing the O ring to slide in said groove when the inner sleeve and insert rotate relative to one another, and (d) A flexible lip axially outside of said second groove and disposed in pressure contact with the surface of the inner sleeve, the normal relaxed diameter of the lip being smaller than that of the remainder of the inner sleeve, said lip provided with an additional ridge projecting transversely inwardly toward said second groove and said inner sleeve, said ridge engaging the O ring at a point in between the planer surface of contact between the O ring and the inner sleeve and the line of contact between the "O" ring and the outer wall of said second groove.

References Cited

UNITED STATES PATENTS

| | | | |
|---|---|---|---|
| 2,923,579 | 2/1960 | Scheel | 308—238 X |
| 2,952,486 | 9/1960 | Reuter | |
| 3,048,413 | 8/1962 | Wood | 277—95 |
| 3,070,408 | 12/1962 | Reuter | 308—238 X |
| 3,076,683 | 2/1963 | Hanley | 308—238 X |
| 3,130,991 | 4/1964 | Piragino | 308—238 X |
| 3,133,769 | 5/1964 | Drake | 308—36.1 |
| 3,180,648 | 4/1965 | Kupfert | 277—95 |
| 3,182,568 | 5/1965 | Davis | 92—194 |
| 3,215,477 | 11/1965 | Arthur | 308—240 X |
| 3,239,286 | 3/1966 | Harrison | 308—36.1 X |
| 3,268,280 | 8/1966 | Miller | 308—36.1 |

FOREIGN PATENTS

| | | |
|---|---|---|
| 1,047,036 | 11/1958 | Germany. |
| 757,124 | 9/1956 | Great Britain. |

MARTIN P. SCHWADRON, *Primary Examiner.*

L. L. JOHNSON, *Assistant Examiner.*